(12) United States Patent
Groschopf

(10) Patent No.: US 11,065,997 B2
(45) Date of Patent: Jul. 20, 2021

(54) MOTOR VEHICLE

(71) Applicant: Dr. Ing. h.c. F. Porsche Aktiengesellschaft, Stuttgart (DE)

(72) Inventor: Thomas Groschopf, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/439,754

(22) Filed: Jun. 13, 2019

(65) Prior Publication Data

US 2019/0389356 A1 Dec. 26, 2019

(30) Foreign Application Priority Data

Jun. 22, 2018 (DE) .................... 10 2018 115 028.8

(51) Int. Cl.
*B60N 3/10* (2006.01)
*B60R 11/00* (2006.01)

(52) U.S. Cl.
CPC ............ *B60N 3/107* (2013.01); *B60N 3/101* (2013.01); *B60N 3/106* (2013.01); *B60R 2011/0007* (2013.01)

(58) Field of Classification Search
CPC ........ B60N 3/107; B60N 3/101; B60N 3/106; B60R 2011/0007
USPC .......... 248/685, 689, 27.3, 27.1, 113, 229.1, 248/229.13, 229.14, 229.16, 229.17, 248/229.2, 229.23, 229.24, 229.26, 248/231.21, 231.61, 231.81, 216.1, 316.5, 248/316.6, 311.2
See application file for complete search history.

(56) References Cited

U.S. PATENT DOCUMENTS

| | | | | |
|---|---|---|---|---|
| 4,767,092 A | * | 8/1988 | Weatherly | A47K 1/08 248/214 |
| 4,951,910 A | * | 8/1990 | March | B60N 3/103 224/482 |
| 4,984,722 A | * | 1/1991 | Moore | B60N 3/102 224/549 |
| 5,167,392 A | * | 12/1992 | Henricksen | B60N 3/102 248/311.2 |
| 5,533,701 A | | 7/1996 | Trank | |
| 5,800,011 A | * | 9/1998 | Spykerman | B60N 3/106 248/311.2 |

(Continued)

FOREIGN PATENT DOCUMENTS

DE 20318845 U1 3/2004
DE 102004005053 A1 8/2005
(Continued)

*Primary Examiner* — Eret C McNichols
*Assistant Examiner* — Michael McDuffie
(74) *Attorney, Agent, or Firm* — Leydig, Voit & Mayer, Ltd.

(57) ABSTRACT

A motor vehicle including a holding device configured to retain objects. The holding device includes at least one holding unit having a base, and a holding structure that extends away from the base in a primary direction and that contains two flexurally elastic lateral jaws that extend, proceeding from the base in the primary direction, to a head region, and a plurality of rigid coupling stays that are articulated on both lateral jaws and are mutually spaced apart in the primary direction. At least one of the flexurally elastic lateral jaws forms a holding jaw for engaging on a respective one of the objects.

20 Claims, 2 Drawing Sheets

(56) References Cited

U.S. PATENT DOCUMENTS

| | | | | |
|---|---|---|---|---|
| 5,897,089 A * | 4/1999 | Lancaster | | B60N 3/102 248/311.2 |
| 6,010,047 A * | 1/2000 | Osborn | | B60N 3/102 224/281 |
| 6,732,894 B2 * | 5/2004 | Hubbert | | B29C 45/14754 224/539 |
| 6,779,770 B2 * | 8/2004 | Kaupp | | B60N 3/101 224/926 |
| 7,533,860 B2 * | 5/2009 | Somuah | | B60N 3/102 248/311.2 |
| 7,896,303 B2 * | 3/2011 | Yamamoto | | B60N 3/106 248/311.2 |
| 8,622,469 B2 * | 1/2014 | Hogg | | B60N 2/643 297/188.04 |
| 8,777,173 B2 * | 7/2014 | Nemoto | | F16M 11/041 248/316.4 |
| 2002/0070324 A1 * | 6/2002 | Huang | | F16M 11/10 248/311.2 |
| 2004/0108346 A1 | 6/2004 | Pablo | | |
| 2005/0035254 A1 * | 2/2005 | Moyer | | B60N 3/106 248/311.2 |
| 2005/0035256 A1 * | 2/2005 | Bruhn | | F16L 3/1203 248/316.1 |
| 2005/0199770 A1 * | 9/2005 | Andrews | | B60N 3/103 248/311.2 |
| 2005/0224674 A1 * | 10/2005 | Park | | B60N 3/106 248/311.2 |
| 2006/0038101 A1 * | 2/2006 | Oana | | B60N 3/102 248/311.2 |
| 2007/0095999 A1 * | 5/2007 | Dubois | | A47K 5/12 248/311.2 |
| 2008/0272259 A1 * | 11/2008 | Zavattieri | | B60N 3/12 248/311.2 |
| 2009/0261221 A1 * | 10/2009 | Kali | | A45F 5/00 248/311.2 |
| 2012/0280100 A1 * | 11/2012 | Stephan | | B60N 3/102 248/311.2 |
| 2013/0092808 A1 * | 4/2013 | Adachi | | A47G 23/0216 248/311.2 |
| 2013/0112831 A1 * | 5/2013 | Kong | | B60N 2/793 248/311.2 |
| 2014/0124638 A1 * | 5/2014 | Takai | | B60N 3/106 248/311.2 |
| 2014/0339846 A1 * | 11/2014 | Masuda | | B60N 3/102 296/37.8 |
| 2015/0217948 A1 | 8/2015 | Fahldieck | | |

FOREIGN PATENT DOCUMENTS

| | | |
|---|---|---|
| DE | 102005054514 A1 | 5/2007 |
| DE | 102014111658 A1 | 2/2016 |
| EP | 2502714 A1 | 9/2012 |
| JP | 2006062529 A | 3/2006 |
| JP | 2009214822 A | 9/2009 |

* cited by examiner

Fig. 1a
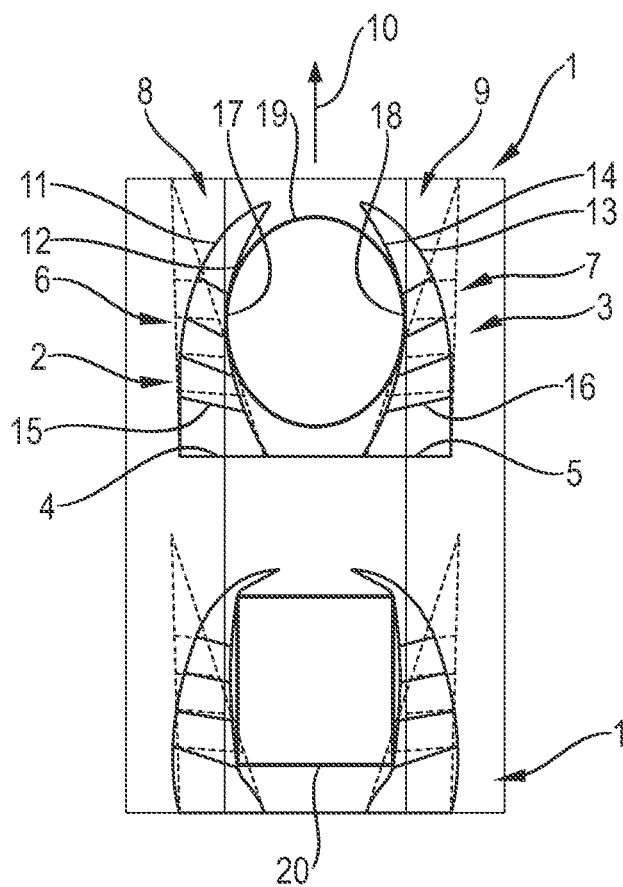
Fig. 1b
Fig. 2
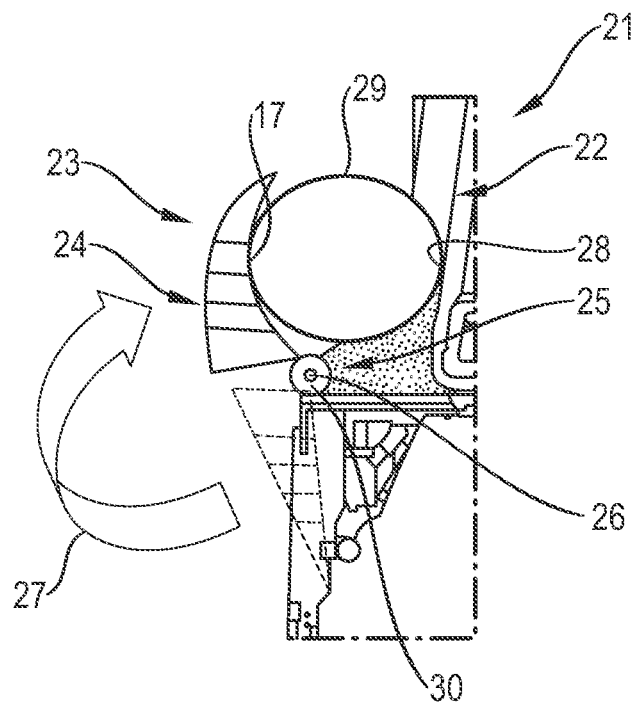

MOTOR VEHICLE

CROSS REFERENCE TO RELATED APPLICATIONS

This application claims benefit to German Patent Application No. DE 10 2018 115 028.8, filed Jun. 22, 2018, which is hereby incorporated by reference herein.

FIELD

The invention relates to a motor vehicle having a holding device, in particular a gripping device, for retaining objects. The invention furthermore relates to a method for retaining objects in a motor vehicle.

BACKGROUND

A motor vehicle having a holder for beverage containers for installation in a motor vehicle is known from the German patent application DE 10 2014 111 658 A1, said holder having two receptacle spaces for inserting in each case one beverage container.

SUMMARY

In an embodiment, the present invention provides a motor vehicle including a holding device configured to retain objects. The holding device includes at least one holding unit having a base, and a holding structure that extends away from the base in a primary direction and that contains two flexurally elastic lateral jaws that extend, proceeding from the base in the primary direction, to a head region, and a plurality of rigid coupling stays that are articulated on both lateral jaws and are mutually spaced apart in the primary direction. At least one of the flexurally elastic lateral jaws forms a holding jaw for engaging on a respective one of the objects.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1*a* shows a holding device having two holding units which encompass a substantially oval object;

FIG. 1*b* shows a holding device similar to the one in FIG. 1, having two holding units which encompass a substantially rectangular object;

FIG. 2 shows a motor vehicle having an instrument panel to which a holding device which has a holding element is attached, said holding element in the use position thereof retaining a circular object.

DETAILED DESCRIPTION

Figure 3:
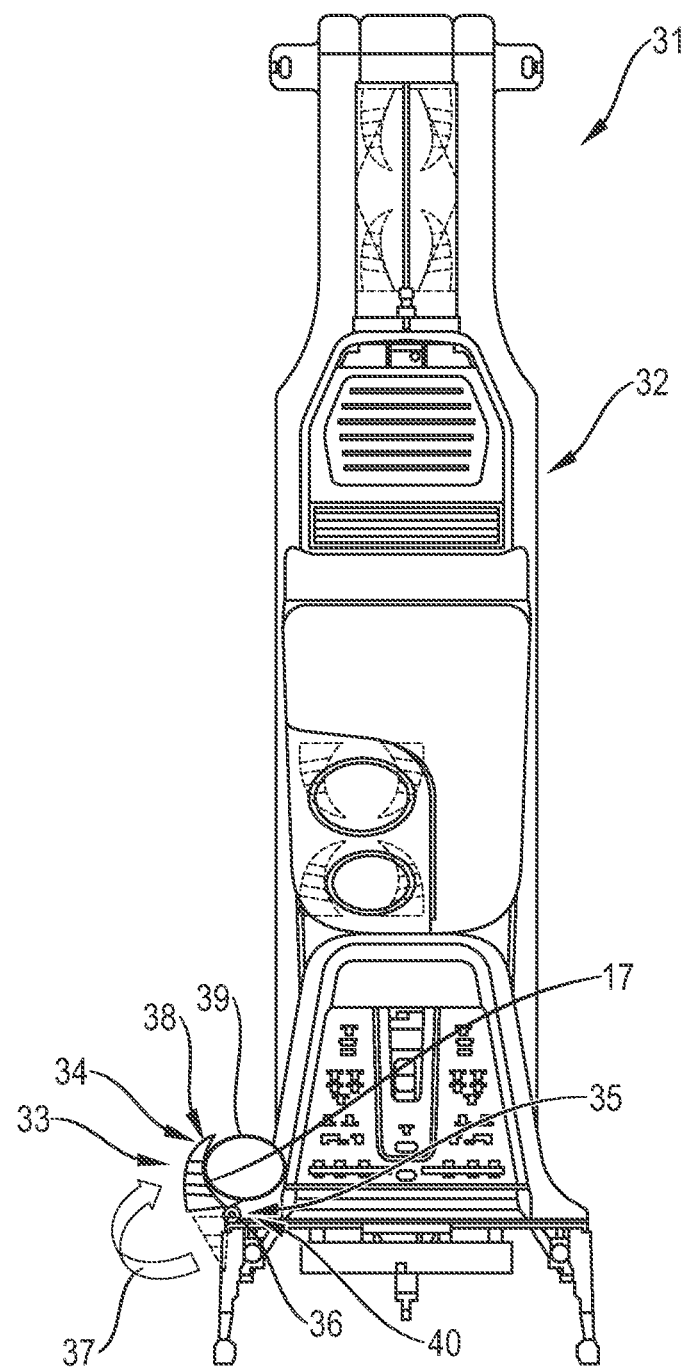
FIG. 3 shows a motor vehicle having a center console to which a holding device having a holding element is attached, said holding element in the use position thereof retaining a substantially oval object.

Embodiments of the invention simplify the safe accommodation of objects in a motor vehicle by way of a holding installation, in particular a gripping installation or clamping installation, for retaining objects.

A motor vehicle is described herein that includes a holding device, in particular a gripping device, for retaining objects in that the holding device, in particular the gripping device, has at least one holding unit which has a base and a holding structure that in a primary direction extends away from the base, wherein the holding structure contains two flexurally elastic lateral jaws that, proceeding from the base and while mutually converging, in the primary direction extend to a head region, and a plurality of coupling stays that are articulated on both lateral jaws and in the primary direction are mutually spaced apart, wherein at least one lateral jaw forms a holding jaw for engaging on the respective object to be retained. The holding device is advantageously embodied as, or in a manner similar to, a holding device disclosed in European patent document EP 2 502 714 B1. The holding device functions according to the FinRay principle, wherein the term FinRay is registered as a trade mark under the number 012023008 under the Paris Convention with the German Patent and Trade Mark Office.

In the case of a motor vehicle having a holding device, in particular a gripping device, for retaining objects, in particular in the case of a motor vehicle described earlier, the holding device can be assigned to an instrument panel in the motor vehicle. Objects of very dissimilar designs can advantageously be held on the instrument panel by way of the holding device, because the at least one holding unit of the holding device advantageously adapts to the shape or design of the object to be held. The adaptation to individual shapes ensures that most diverse geometries are held in an optimal manner. As opposed to conventional beverage holders, other objects having non-defined shapes, for example keys or mobile phones, can thus be held. The holding device thus can advantageously also be used as a beverage holder, as a stowage compartment, or as a mobile phone holder.

In the case of a motor vehicle having a holding device, in particular a gripping device, for retaining objects, in particular in the case of a motor vehicle described earlier, the holding device can be assigned to a center console in the motor vehicle. Objects of very dissimilar designs can advantageously be held on the center console by way of the holding device, because the at least one holding unit of the holding device advantageously adapts to the shape or design of the object to be held. The adaptation to individual shapes ensures that most diverse geometries are held in an optimal manner. As opposed to conventional beverage holders, other objects having non-defined shapes, for example keys or mobile phones, can thus be held. The holding device thus can advantageously also be used as a beverage holder, as a stowage compartment, or as a mobile phone holder.

One preferred exemplary embodiment of the motor vehicle is characterized in that the holding device comprises two holding units, at least one object being capable of being jammed between said two holding units. Depending on the embodiment of the holding units and depending on the design of the object to be jammed, a plurality of objects can also be jammed between the two holding units in order for the objects to be safely retained.

One further preferred exemplary embodiment of the motor vehicle is characterized in that the holding device comprises only one holding unit with the aid of which at least one object is capable of being jammed between the holding unit and a holding structure that is stationary relative to the holding unit. The holding structure is advantageously provided on an interior equipment part of the motor vehicle. The use of the interior equipment part of the motor vehicle for retaining the object offers inter alia the advantage that the holding device requires only one holding unit.

One further preferred exemplary embodiment of the motor vehicle is characterized in that the holding device is combined with a folding mechanism for the at least one holding unit which by the folding mechanism is pivotable between a folded-in basic position and a folded-out use position. The folding mechanism advantageously comprises a pivoting kinematic system which enables the at least one holding unit to be repeatedly pivoted between the folded-in basic position and the folded-out use position. The folding mechanism, in particular the kinematic system, is advantageously embodied and disposed such that the at least one holding unit when being folded out to the use position, in particular by way of the holding jaw of said holding unit, automatically adapts to the shape or design of the object to be held.

One further preferred exemplary embodiment of the motor vehicle is characterized in that the at least one holding unit in the folded-in basic position thereof is retracted, in particular so as to be at least partially obscured, in an interior equipment part of the motor vehicle, or bears on the interior equipment part of the motor vehicle. Depending on the embodiment, an additional cover can be used in order for the holding unit in the folded-in basic position thereof to be hidden in the interior equipment part. When the holding unit in the folded-in basic position thereof bears on the interior equipment part, the holding structure of the holding unit in this instance advantageously hugs a surface of the interior equipment part of the motor vehicle.

One further preferred exemplary embodiment of the motor vehicle is characterized in that the holding device, conjointly with the folding mechanism, comprises a drive for the folding mechanism and the at least one holding unit. The drive can comprise, for example, a spring installation which is manually activatable. The spring installation is advantageously embodied such that the holding unit is pre-tensioned to the folded-in basic position thereof and/or to the folded-out use position thereof. The drive, conjointly with the spring installation, is preferably manually activatable. However, the drive can also be fully or partially automated. For this purpose, the folding mechanism and the at least one holding unit comprise, for example, a mechanical, an electrical, and/or a fluidic, in particular pneumatic, drive.

Alternatively or additionally, embodiments of the invention provide a method for retaining objects in a motor vehicle described earlier.

One preferred exemplary embodiment of the method is characterized in that the at least one holding installation is manually or automatically pivoted from the folded-in basic position thereof to the folded-out use position thereof such that the at least one holding unit adapts to the design of the at least one object to be retained. The holding unit is either manually or mechanically, electrically or fluidically, in particular pneumatically, impinged with a sufficient activation force. The holding unit is advantageously pivoted from the folded-in basic position thereof so far until the holding unit, in particular by way of the holding jaw thereof, bears on a geometry to be gripped, to be held, or to be clamped, of the object to be retained. The geometry of the holding jaw of the holding unit herein advantageously adapts to the geometry of the object to be retained. The holding device of the holding unit in the folded-in basic position is advantageously disposed so as not to be visible at all, or at least so as not to be conspicuous, in the interior space of the motor vehicle. Depending on the embodiment, the holding unit in the folded-in basic position thereof can be covered by a cover or case.

Embodiments of the invention further provide holding units, instrument panels, center consoles, interior equipment parts, and/or folding mechanisms for a motor vehicle as described earlier. The parts mentioned are separately marketable.

A holding device 1 having two holding units 2, 3 is illustrated in FIGS. 1a and 1b. The holding units 2, 3 in the use position thereof are illustrated with solid lines. The holding units 2, 3 in a basic position are illustrated with dashed lines.

The holding units 2, 3 comprise in each case one base 4, 5 from which a holding structure 6, 7 extends away in a primary direction indicated by an arrow 10. The holding structure 6, 7 comprises two flexurally elastic lateral jaws 11, 12 and 13, 14 that, proceeding from the base 4, 5 and while mutually converging, in the primary direction 10 extend to a head region 8, 9.

The holding structure 6, 7 moreover comprises rigid coupling stays 15, 16 that are in each case articulated on both lateral jaws 11, 12 and 13, 14, and in the primary direction 10 are mutually spaced apart. The mutually facing lateral jaws 12 and 14 of the holding units 2, 3 form holding jaws 17, 18 that serve for engaging on an object 19, 20 to be retained.

An oval object 19 is jammed between the two holding jaws 17, 18 of the holding units 2, 3 in FIG. 1a. A substantially square object 20 is jammed between the two holding jaws 17, 18 of the holding units 2, 3 in FIG. 1b.

The lateral jaws 12, 14, or holding jaws 17, 18, respectively, of the holding units 2, 3 in the use position of said jaws 12, 14, 17, 18 advantageously adapt to the design of the respective object 19, 20. A stable fastening of the objects 19, 20 to a motor vehicle equipped with the holding device 1 is enabled in a simple manner on account thereof.

A motor vehicle 21 having an instrument panel 22 in the interior space is illustrated in a simplified manner in FIG. 2. A holding device 23 is attached to the instrument panel 22. The holding device 23 comprises a holding unit 24 which in terms of the construction and the functioning thereof corresponds to the holding unit 2 of the holding device 1 illustrated in FIG. 1.

The holding device 23 is combined with a folding mechanism 25. The folding mechanism 25 enables the holding unit 24 to be pivoted about a pivoting axis 26, between a folded-in basic position and a folded-out use position.

The holding unit 23 in the folded-out use position is illustrated by solid lines. The holding unit 24 in the folded-in basic position thereof is illustrated with dashed lines. It is indicated by an arrow 27 in FIG. 2 how the holding unit 24 is folded out from the basic position thereof to the use position thereof.

The folding mechanism 25 advantageously comprises a kinematic system by way of which the holding unit 24 in the use position thereof, by way of a holding jaw 17, automatically adapts to a design of an object 29. The object 29 in FIG. 2 is substantially circular or spherical and, as can be seen in FIG. 2, is jammed in a stable manner between the holding jaw 17 of the holding unit 24 and a holding structure 28 which is configured on the instrument panel 22. Utilizing the holding structure 28 on the instrument panel 22 offers the advantage that the holding device 23, as opposed to the holding device 1 illustrated in FIG. 1, requires only one holding unit 24.

A motor vehicle 31 having a center console 32 in the interior space is illustrated in the plan view in FIG. 3. A holding device 33 having a holding unit 34 is attached to the center console 32. The holding unit 34 in terms of the construction thereof and the functioning thereof corresponds to the holding unit 2 of the holding device 1 from FIG. 1.

The holding device 33, with the aid of a folding mechanism 35, is attached to the center console 32 so as to be pivotable about a pivot axis 36. The holding unit 34 is illustrated in the use position thereof with the aid of solid lines. The holding unit 34 in the folded-in basic position thereof is illustrated by dashed or dotted lines, respectively.

It is indicated by an arrow 37 in FIG. 3 how the holding unit 34 is folded out from the basic position thereof to the use position thereof. A substantially oval object 39 is jammed between a holding jaw 17 of the holding unit 34, the latter being situated in the use position thereof, and a holding structure 38 which is configured on the center console 32.

The folding mechanism 35 is advantageously embodied and combined with the holding unit 34 such that the holding unit 34 in the use position thereof, by way of the holding jaw 17, hugs the object 39. A stable retention of the object 39 with the aid of the holding device 33 on the center console 32 is enabled in a simple manner on account thereof.

The holding device 23; 33 combined with the folding mechanism 25; 35 and illustrated in FIGS. 2 and 3 is advantageously equipped with a suitable mechanical, electrical or pneumatic drive 30; 40. Alternatively or additionally, the drive 30; 40 can be equipped with a spring installation.

The drive 30; 40 is advantageously triggered by hand, or manually, respectively. The triggering, or pivoting, respectively, of the holding unit 24; 34 is initiated, for example, by lightly touching, or pushing, respectively, the latter, in particular by way of a push-push locking mechanism.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle comprising:
    a holding device configured to retain objects, the holding device comprising:
        a base, and
        a flexurally elastic lateral jaw that extends, in the primary direction, from the base to a head region,
        a plurality of rigid coupling stays that are articulated on the lateral jaw and that are mutually spaced apart in the primary direction, and
        a folding mechanism configured to pivot the flexurally elastic lateral jaw between a folded-in position and a folded-out position,
    wherein the flexurally elastic lateral jaw is configured to transition from a basic configuration, in which the flexurally elastic lateral jaw has a first geometry, to a use configuration,
    wherein the flexurally elastic lateral jaw is configured to transition from the basic configuration to the use configuration by deforming from the first geometry to a second geometry, and
    wherein the flexurally elastic lateral jaw is configured to transition from the basic configuration to the use configuration by deforming, while being pivoted from the folded-in position to the folded-out position, from the first geometry to a second geometry that corresponds, at least in part, to a geometry of an object to be retained.

2. The motor vehicle as claimed in claim 1, wherein the holding device is assigned to an instrument panel in the motor vehicle.

3. The motor vehicle as claimed in claim 2, wherein the holding structure further includes a second flexurally elastic lateral jaw, wherein the flexurally elastic lateral jaw and the second flexurally elastic lateral jaw are configured to hold objects to be retained therebetween.

4. The motor vehicle as claimed in claim 2, wherein the holding device further includes a stationary holding structure, wherein the flexurally elastic lateral jaw is configured to hold objects to be retained against the stationary holding structure.

5. The motor vehicle as claimed in claim 1, wherein the holding device is assigned to a central console of the motor vehicle.

6. The motor vehicle as claimed in claim 5, wherein the holding structure further includes a second flexurally elastic lateral jaw, wherein the flexurally elastic lateral jaw and the second flexurally elastic lateral jaw are configured to hold objects to be retained therebetween.

7. The motor vehicle as claimed in claim 5, wherein the holding device further includes a stationary holding structure, wherein the flexurally elastic lateral jaw is configured to hold objects to be retained against the stationary holding structure.

8. The motor vehicle as claimed in claim 1, wherein, in the folded-in position, the flexurally elastic lateral jaw is retracted in an interior equipment part of the motor vehicle or bears on the interior equipment part of the motor vehicle.

9. The motor vehicle as claimed in claim 1, wherein the folding mechanism includes a drive.

10. A holding unit, an instrument panel, a center console, an interior equipment part, and/or a folding mechanism for a motor vehicle as claimed in claim 1.

11. The motor vehicle as claimed in claim 1, wherein the second geometry is a variable geometry that corresponds, at least in part, to a geometry of an object to be retained.

12. The motor vehicle as claimed in claim 1, wherein the folding mechanism includes a kinematic system that enables the flexurally elastic lateral jaw to be repeatedly pivoted between the folded-in position and the folded-out position.

13. The motor vehicle as claimed in claim 12, wherein the kinematic system is configured to cause the flexurally elastic lateral jaw to deform from the first geometry to the second geometry while the folding mechanism pivots the flexurally elastic lateral jaw between the folded-in position and the folded-out position.

14. The motor vehicle as claimed in claim 1, wherein the flexurally elastic lateral jaw includes an interior face configured to contact an object to be retained, wherein the interior face has a planar shape in the first geometry and a concave shape in the second geometry.

15. The motor vehicle as claimed in claim 1, wherein the flexurally elastic lateral jaw includes an interior face configured to contact an object to be retained, wherein the interior face has a planar shape in the first geometry, and wherein the second geometry includes, at least in part, a concave shape.

16. A method for retaining objects in a motor vehicle, the method comprising:
   manually or automatically pivoting, from a folded-in basic position thereof to a folded-out use position, a flexurally elastic lateral jaw such that the flexurally elastic lateral jaw adapts to a shape of an object to be retained,
   wherein the flexurally elastic lateral jaw is a component of a holding device configured to retain objects,
   wherein the holding device further includes a base,
   wherein the flexurally elastic lateral jaw extends away from the base in a primary direction to a head region, and wherein a plurality of rigid coupling stays are articulated on the flexurally elastic lateral jaw and are mutually spaced apart in the primary direction,
   wherein the flexurally elastic lateral jaw is configured to transition from the basic position, in which the flexurally elastic lateral jaw has a first geometry, to the use position,
   wherein the flexurally elastic lateral jaw is configured to transition from the basic position to the use position by deforming from the first geometry to a second geometry, and
   wherein the flexurally elastic lateral jaw is configured to transition from the basic position to the use position by deforming, while being pivoted from the folded-in position to the folded-out use position, from the first geometry to the second geometry that corresponds, at least in part, to a geometry of an object to be retained.

17. A holding apparatus configured to be incorporated into a motor vehicle, the holding apparatus comprising:
   a holding device configured to retain objects, the holding device comprising:
      a base, and
      a flexurally elastic lateral jaw that extends, in the primary direction, from the base to a head region,
      a plurality of rigid coupling stays that are articulated on the lateral jaw and that are mutually spaced apart in the primary direction, and
      a folding mechanism configured to pivot the flexurally elastic lateral jaw between a folded-in position and a folded-out position,
   wherein the flexurally elastic lateral jaw is configured to transition from a basic configuration, in which the flexurally elastic lateral jaw has a first geometry, to a use configuration,
   wherein the flexurally elastic lateral jaw is configured to transition from the basic configuration to the use configuration by deforming from the first geometry to a second geometry,
   wherein the folding mechanism includes a kinematic system that enables the flexurally elastic lateral jaw to be repeatedly pivoted between the folded-in position and the folded-out position, and
   wherein the kinematic system is configured to cause the flexurally elastic lateral jaw to deform from the first geometry to the second geometry while the folding mechanism pivots the flexurally elastic lateral jaw between the folded-in position and the folded-out position.

18. A holding unit, an instrument panel, a center console, or an interior equipment part comprising a holding apparatus as claimed in claim 17.

19. The holding apparatus as claimed in claim 17, wherein the holding device further includes a second flexurally elastic lateral jaw, wherein the flexurally elastic lateral jaw and the second flexurally elastic lateral jaw are configured to hold objects to be retained therebetween.

20. The holding apparatus as claimed in claim 17, wherein the holding device further includes a stationary holding structure, wherein the flexurally elastic lateral jaw is configured to hold objects to be retained against the stationary holding structure.

* * * * *